US008012398B2

(12) United States Patent
Zadesky et al.

(10) Patent No.: US 8,012,398 B2
(45) Date of Patent: *Sep. 6, 2011

(54) HOUSING OF AN ELECTRONIC DEVICE FORMED BY DOUBLESHOT INJECTION MOLDING (75) Inventors: Stephen Paul Zadesky, Portola Valley, CA (US); Evans Hankey, San Francisco, CA (US); Jonathan P. Ive, San Francisco, CA (US); Rico Zorkendorfer, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/710,261

(22) Filed: Feb. 22, 2010

(65) Prior Publication Data
US 2010/0149735 A1 Jun. 17, 2010

Related U.S. Application Data (60) Continuation of application No. 11/782,175, filed on Jul. 24, 2007, now Pat. No. 7,695,665, which is a division of application No. 11/205,850, filed on Aug. 16, 2005, now abandoned.

(51) Int. Cl.
*B29C 45/14* (2006.01)
(52) U.S. Cl. ............... 264/328.8; 264/268; 264/272.11; 264/272.15; 264/255
(58) Field of Classification Search .................. None
See application file for complete search history.

(56) References Cited

U.S. PATENT DOCUMENTS

| 3,543,338 | A | 12/1970 | Cooper |
| 4,465,919 | A | 8/1984 | Roder |
| 4,935,184 | A | 6/1990 | Sorensen |
| 5,993,720 | A | 11/1999 | Konuma et al. |
| 6,809,254 | B2 | 10/2004 | Clement et al. |
| D540,539 | S | 4/2007 | Gutierrez |
| 2006/0052144 | A1 | 3/2006 | Seil et al. |

OTHER PUBLICATIONS

"Two-Shot Injection Molding," Vonage, downloaded on Apr. 11, 2005, http://composite.about.com/library/glossary/t/bldef-t5772.htm, 3 pages.
"About Injection Molded Plastics," IQS, Industrial Quick Search, Inc., downloaded on Apr. 11, 2005, http://www.injection-molded-plastics.net/info/injection-molded-plastics/, 2 pages.
"Multi-Component Molding," Ticona Engineering Polymers, downloaded on Apr. 11, 2005, http://www.ticona.com/index/tech/processing/special_injection_molding/multi-component, 4 pages.

(Continued)

*Primary Examiner* — Monica A Huson
(74) *Attorney, Agent, or Firm* — Beyer Law Group LLP (57) ABSTRACT A method for forming an enclosure for enclosing internal electronic components of an electronic device is provided, which comprises: performing a first injection molding process, the first injection molding process forming at least a first wall of the enclosure; allowing the at least a first wall of the enclosure to solidify; thereafter performing a second injection molding process, the second injection molding process forming at least a second wall of the enclosure, the at least a second wall of the enclosure fusing with the at least a first wall of the enclosure during the second injection molding process, the at least second wall of the enclosure forming at least one different side of the enclosure than the at least first wall of the enclosure; and allowing the at least a second wall of the enclosure to solidify, the at least a second wall of the enclosure being integrally formed with the at least a first wall of the enclosure to thereby form a single-piece multi-walled enclosure.

19 Claims, 8 Drawing Sheets

OTHER PUBLICATIONS

"Plastic Molding Services Specificaitons—Molding Process," GlobalSpec, The Engineering Search Engine, downloaded on Apr. 11, 2005, http://plastic-injection-molding.globalspec.com/Specifications/Part_Fabrication_Production, 8 pages.

"5.0-Multi-Material Mold Design," Chapter 5, downloaded on Apr. 11, 2005, http://www.isr.umd.edu/Labs//CIM/M3T/Chapter5.htm, 3 pages.

Office Action dated Mar. 4, 2008 from U.S. Appl. No. 11/205,850.
Office Action dated Sep. 14, 2007 from U.S. Appl. No. 11/205,850.
Office Action dated Apr. 12, 2007 from U.S. Appl. No. 11/205,850.
Office Action dated Jan. 29, 2007 from U.S. Appl. No. 11/205,850.
Office Action dated Apr. 15, 2009 from U.S. Appl. No. 11/782,175.
Office Action dated Sep. 22, 2009 from U.S. Appl. No. 11/782,175.
Notice of Allowance dated Dec. 2, 2009 from U.S. Appl. No. 11/782,175.

HOUSING OF AN ELECTRONIC DEVICE FORMED BY DOUBLESHOT INJECTION MOLDING

CROSS-REFERENCE TO RELATED APPLICATION

This application is a continuation of and claims priority under 35 U.S.C. §120 to U.S. application Ser. No. 11/782,175, entitled "HOUSING OF AN ELECTRONIC DEVICE FORMED BY DOUBLESHOT INJECTION MOLDING," filed Jul. 24, 2007, now U.S. Pat. No. 7,695,665 which is a divisional of U.S. application Ser. No. 11/205,850, entitled "HOUSING OF AN ELECTRONIC DEVICE FORMED BY DOUBLESHOT INJECTION MOLDING," filed on Aug. 16, 2005 now abandoned, which is incorporated herein by reference in its entirety and for all purposes.

BACKGROUND OF THE INVENTION

1. Field of the Invention

The present invention relates generally to methods of injection molding and housings formed therefrom. More particularly, the present invention relates to a housing of an electronic device formed by double shot injection molding.

2. Description of the Related Art

Injection molding is one of the most popular processes for manufacturing plastic products. The injection molding process generally includes (1) injecting molten plastic material into a closed mold, (2) allowing the plastic to cool down and solidify, and (3) ejecting the finished product from the mold. This process may for example be used to form enclosures or housings for various electronic products.

Figure 1A:
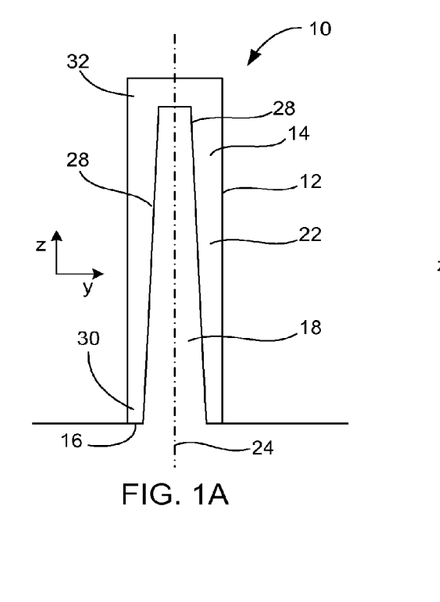
FIG. 1 illustrates a standard injection molding process.
Figure 1B:
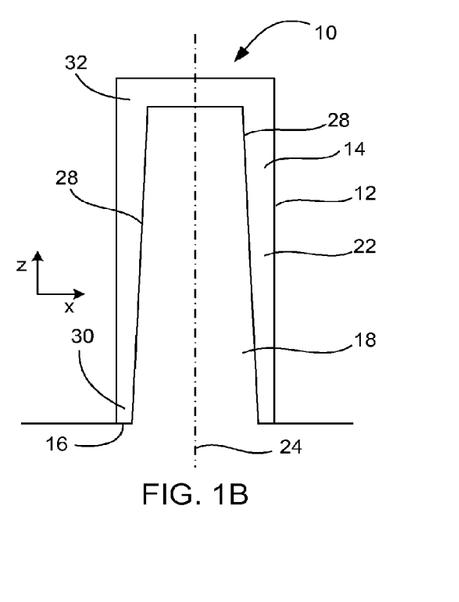

Referring to FIG. 1, in order to mold a single opening enclosure for electronic devices using standard injection molding processes, the mold 10 typically consists of two parts, a first mold half 12 that includes a cavity 14, and a second mold half 16 that includes a core 18. When the two mold halves 12 and 16 close, the core 18 is placed inside the cavity 14, and plastic is injected through a gate into the open space 22 found between the cavity 14 and the core 18 thereby forming a box like part with an open end. The part is typically formed vertically along its longitudinal axis 24. After allowing the part to cool, the two mold halves 12 and 16 open and the solidified part is ejected out of the mold, and more particularly the cavity 14 of the first mold half 12.

In order to allow proper removal of the core 18 when the mold halves 12 and 16 are opened, the core 18 typically includes a draft angle 28 on each of its sides (e.g., four sides). The draft angle 28 is the amount of taper required to allow the proper removal of the core 18 from the molded part along the axis 24. That is, the draft angle 28 allows the core 18 to slide out of the molded part when the molds are opened. The larger the draft angle 28, the easier it is to get the core 18 out of the part. If there is no draft angle 28 the core 18 may be difficult to remove from the molded part (the part shrinks around the core). Although the draft angle depends on the part design, in most cases a 2 degree draft angle per side is used. However, the minimum requirement is typically 1 degree and in some cases the draft angle may be as small as ½ degree. However, in elongated parts that extend longitudinally as shown, the draft angle 28 tends to be on the high side as for example at least one degree and more likely 2 degrees. If a large draft angle is not used, the sticktion force between the part and the core 18 is difficult to overcome. And even if the sticktion force is overcome, stresses may be induced in the molded part and/or the part may be damaged during ejection. A large sticktion force is typically caused by the large surface area between the part and the core in the direction of the release (e.g., along the longitudinal axis 24).

Unfortunately, because of the draft angle 28, the inside walls of the molded part are also tapered and as a result the thickness of the molded part is non-uniform. The thickness varies longitudinally from thin at the open end 30 to thick at the closed end 32. While this may not be too problematic in low depth parts, it can be especially problematic in elongated parts, as the thickness can become very large at the closed end. In enclosures for electronic devices, especially small handheld electronic devices, either the outer dimensions of the part have to grow to provide the internal space necessary for the internal electronics or the device is left with less room for these components. That is, the draft either reduces the amount usable space inside the enclosure or drives the outside of the enclosure larger to create the same space for the electronic components inside. Neither of these results is desirable in small handheld devices where the outer dimensions are highly controlled and the internal space is at a premium. Furthermore, the thick wall sections may yield cosmetic issues such as sinks, cooling/flatness issues, etc. and require additional plastic material that is not needed thereby driving up the cost of the product.

In some cases, it may be desirable to place internal features such as protrusions, recesses, undercuts, on the inside surfaces of the molded part. In cases such as these, the core may include a mechanical action. The mechanical action forces the part off of the core and at the same time causes the part to be lifted away from the internal feature thereby allowing the core to be released from the molded part. If the core was not lifted away, the part would get stuck on the core as its removed along the longitudinal axis. By way of example, the core may include a lifter that forms the internal feature on the inside surface and then moves away from the internal feature in order to provide enough clearance during removal.

Unfortunately, mechanical actions require large cores so they are not possible with smaller parts, especially small parts that are thin and long (as shown). With parts such as these, there is simply not enough room inside the part for mechanical actions such as those created by lifters. This is especially true at the closed end of the part. Even if a lifter was somehow placed on the core, it probably wouldn't make too many cycles before it failed. Because of the small size, the lifter would overheat and self destruct.

Injection molding is not limited to forming parts as described above. In some cases, injection molding may be used to put decorative features on the outer surfaces of a part. This may be accomplished using a technique called double shot injection molding. In double shot injection molding, the molding process utilizes two injections. One of the injections is used to form the part (as described above for example), and the second injection is used to create an outer layer around some or all of the part (or vice versa). By way of example, double shot injection molding may be used to place a soft layer on top of a hard layer, a transparent layer on top of an opaque layer, or create multicolored layers. In the case of an enclosure as discussed above, double shot injection molding typically only serves to enhance the look and feel of the enclosure. It does not help form the enclosure itself, as for example each of the various walls Thus, there is a need for improved approaches for molding thin elongated enclosures, especially those for small handheld electronic devices.

SUMMARY OF THE INVENTION

The invention relates, in one embodiment, to a method for forming an enclosure for enclosing internal electronic components of an electronic device is provided, which comprises: performing a first injection molding process, the first injection molding process forming at least a first wall of the enclosure; allowing the at least a first wall of the enclosure to solidify; thereafter performing a second injection molding process, the second injection molding process forming at least a second wall of the enclosure, the at least a second wall of the enclosure fusing with the at least a first wall of the enclosure during the second injection molding process, the at least second wall of the enclosure forming at least one different side of the enclosure than the at least first wall of the enclosure; and allowing the at least a second wall of the enclosure to solidify, the at least a second wall of the enclosure being integrally formed with the at least a first wall of the enclosure to thereby form a single-piece multi-walled enclosure.

The invention relates, in another embodiment, to a method of forming a multi-walled enclosure that defines an open space for placement of internal components via a double shot injection molding process.

The invention relates, in another embodiment, to a method of forming a single opening enclosure. The method includes performing a first injection mold process. The first injection mold process forms a front wall, right and left side walls, and a top wall of the single opening enclosure. The method also includes performing a second injection mold process. The second injection mold process forms a back wall of the single opening enclosure. The back wall is made integral with the front, right, left and top walls so as to form a single integral part.

The invention relates, in another embodiment, to a double shot injection molding method for producing an enclosure of an electronic device having five walls and an open end. The double shot injection molding method includes providing a mold A and a mold B. Mold A includes a first injecting area and second injecting area. The first injecting area includes a core. The second injecting area includes a cavity and a movable insert for forming a wall of the enclosure. Mold B includes a cavity that cooperates with the core to form multiple walls of the enclosure. The method also includes engaging mold A with mold B so that the core of mold A is partially inserted into the cavity of mold B. The mold cooperating to form a void associated with a first half of the enclosure. The method further includes injecting plastic into the void so as to form a first half of the enclosure. The method additionally includes allowing the first half of the enclosure to cool and solidify.

Once solidified, the method continues by disengaging mold A and mold B. The first half of the enclosure remains in the mold B after disengagement. The method also includes rotating mold B so that the first half of the enclosure is aligned with the second injection area of mold A. The method further includes engaging mold A with mold B. The movable insert is inserted into the first half of the enclosure so that only the edges of the first half of the enclosure are exposed to the cavity of mold A. The method further includes injecting plastic into the cavity of mold A so as to form a second half of the enclosure. The second half of the enclosure fuses with the first half of the enclosure during the injection. The method additionally includes allowing the second half of the enclosure to cool and solidify. The second half of the enclosure is integrally formed with the first half of the enclosure thereby producing the entire enclosure.

Once formed, the method continues by removing the insert from the entire enclosure. The method also includes disengaging mold A and mold B. The entire enclosure remains in mold B after disengagement. The method further includes ejecting the entire enclosure from mold B.

The invention relates, in another embodiment, to a method of forming an enclosure. The method includes forming first void. The first void forms a first set of walls of the enclosure. The method also includes injecting plastic into first void to form a first part. The method further includes allowing first part to solidify. The method additionally includes inserting wedge into first part.

Moreover, the method includes forming second void. The second void forms the remaining walls of the enclosure. The method also includes injecting plastic into the second void to form a second part. The second part fuses with the first part during the injection thereby forming a final enclosure with integral first and second parts. The method further includes allowing the second part to solidify. The method additionally includes removing the wedge from the final part. The final part has five walls and an open end.

BRIEF DESCRIPTION OF THE DRAWINGS

The invention may best be understood by reference to the following description taken in conjunction with the accompanying drawings in which.

DETAILED DESCRIPTION OF THE INVENTION

The present invention proposes a two shot injection process for forming an enclosure for an electronic device. The two shot injection process allows for a thinner walled enclosure that uses less materials and allows for added structural features that would not be possible using traditional molding techniques. The two shot injection process generally includes forming one or more walls of an enclosure with a first shot and thereafter forming the remaining walls of the enclosure with a second shot. During the second shot, the walls fuse together thereby forming an integrally molded enclosure that is one piece.

Embodiments of the invention are discussed below with reference to FIGS. 2-8. However, those skilled in the art will readily appreciate that the detailed description given herein with respect to these figures is for explanatory purposes as the invention extends beyond these limited embodiments.

Figure 2:
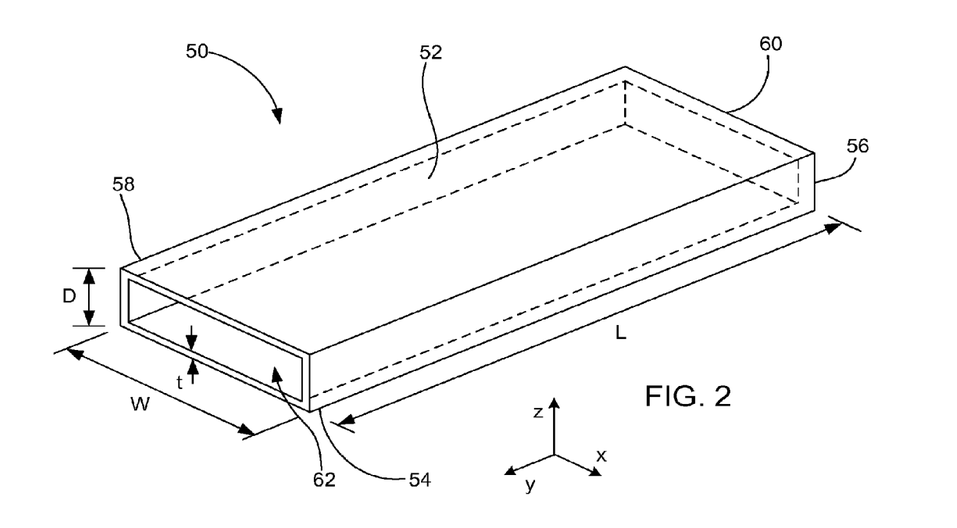
FIG. 2 is a perspective diagram of an enclosure for an electronic device, in accordance with one embodiment of the present invention.

FIG. 2 is a perspective diagram of an enclosure 50 for an electronic device, in accordance with one embodiment of the present invention. The enclosure 50 includes five walls—a front wall 52, a back wall 54, a right side wall 56, a left side wall 58 and a top wall 60. The enclosure 50 also includes an open end 62 at the bottom of the enclosure 50. The enclosure 50 extends longitudinally from the top to bottom end of the enclosure 50. The dimensions of the enclosure 50 are defined by length L, width W, depth D and thickness t.

Although the dimensions can be widely varied, in one particular embodiment, the enclosure 50 is thin and long and therefore the depth D is small and the length L is large. By way of example, the length L may be about 8 times the dimension of the depth D. In one embodiment, the enclosure has a depth of about 8.5 mm, a width of about 24.1 mm, a length of about 68.4 mm and a thickness t between about 1 mm to about 1.5 mm. It should be noted however is not a limitation but rather an example of a particular thin and elongated enclosure. By way of example, this example may generally correspond to the dimensions of the enclosure used in the iPod Shuffle manufactured by Apple Computer of Cupertino, Calif.

As mentioned in the background, this configuration of an enclosure (long and thin) presents problems when molding the enclosure using conventional techniques. For example, large tapers must be used, and further forming internal features is nearly impossible. In order to overcome these problems, the present invention proposes forming the enclosure 50 in two or more injection molding steps rather than just one injection molding step. In the first step one or more walls are created, and in the second step, the remaining walls are created. More particularly, a first side of the enclosure is formed with the first injection and a second side of the enclosure is formed with the second injection. Although done in two steps, all the walls are integrally formed as the remaining walls fuse with the existing walls during the second injection molding process. These steps can be performed on the same machine in the same cycle (double shot) or separate machines (transfer) in different cycles.

Figure 3:
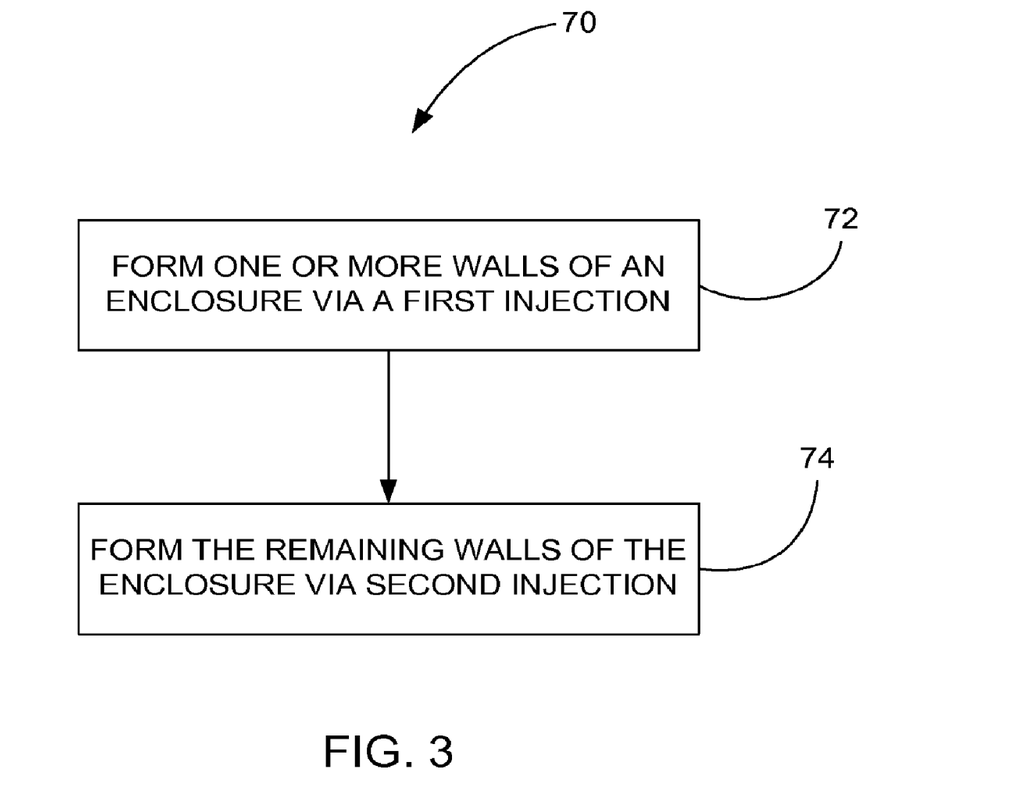
FIG. 3 is a flow diagram of a two shot injection method for forming an enclosure of an electronic device, in accordance with one embodiment of the present invention.

FIG. 3 is a flow diagram of a two shot injection method 70 for forming an enclosure of an electronic device, in accordance with one embodiment of the present invention. The method 70 may for example be used to form the enclosure 50 shown in FIG. 2. The method 70 includes blocks 72 and 74. In block 72, one or more walls of an enclosure are formed via a first injection. In block 74, the remaining walls of the enclosure are formed via a second injection. During the second injection, the molten plastic that forms the remaining walls fuses with the solidified walls formed during the first injection thereby forming a single solid enclosure with integral walls.

By utilizing two process steps, the taper that would normally exist is substantially minimized or completely eliminated from the inside surfaces of the enclosure. As such, the internal space of the enclosure is capable of fitting the desired internal components without increasing the outer dimensions of the enclosure. Furthermore, internal features can be placed on the inner surfaces without using a mechanical action. Mechanical actions for creating internal features are nearly impossible with enclosures of this type (e.g., thin and long).

Further advantages can be realized when you consider that the two injection processes can use the same or different materials. In one embodiment, the first and second injections use the same plastic material. This may be beneficial in that this typically provides the best bond strength. In another embodiment, the first and second injections use different materials or the same materials with different characteristics (e.g., color). The materials may for example be selected from polycarbonate (PC), ABS or PC-ABS plastic materials. Polycarbonate has been found to work particularly well. In one implementation, both injections use polycarbonate. In another implementation, one of the injections uses polycarbonate, and the other injection uses ABS. In yet another implementation, one of the injections uses polycarbonate, and the other injections uses PC-ABS.

In one embodiment, and referring to FIGS. 2 and 3, the front wall 52, side walls 56 and 58, and top wall 60, are formed in the first injection molding process, and the back wall 54 is formed in the second injection molding process. This arrangement has been found to work particularly well. In fact, the inside surface of the front wall can be made with zero taper, and the inside surface of the back wall can be made with a limited taper such as substantially zero. Furthermore, the inside surfaces of the right and left sides can be made with zero taper along the y axis and minimal taper in the z direction as for example substantially zero. As a result, the thickness t of the enclosure can remain substantially uniform from the top and bottom ends.

It should be pointed out, however, that although this embodiment is directed at creating the front, sides and top of the enclosure in a first process, and the back wall of the enclosure in a second process, this is not a limitation and that the two or more process steps may be used to form a different arrangement of walls. For example, the front wall may be formed in the first step and the remaining walls may be formed in the second step. Alternatively, the back and one of the side walls may be formed in a first process and the front and the remaining side walls may be formed in the second process (or vice versa).

Figure 4A:
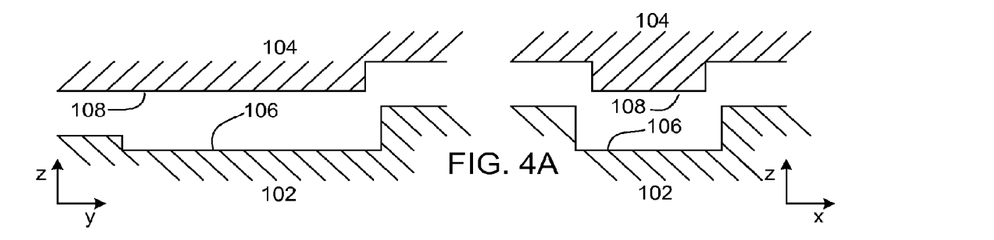
FIGS. 4A-J illustrate a method for forming an enclosure of an electronic device, in accordance with one embodiment of the present invention.

FIGS. 4A-J illustrate a method for forming an enclosure of an electronic device, in accordance with one embodiment of the present invention. The method may for example be used to form the enclosure shown in FIG. 2. Each Figure includes both a cross sectional side view and a cross section top view. FIG. 4A illustrates a first mold 102 and a second mold 104. The first mold 102 includes a cavity 106 and the second mold 104 includes a core 108.

Figure 4B:
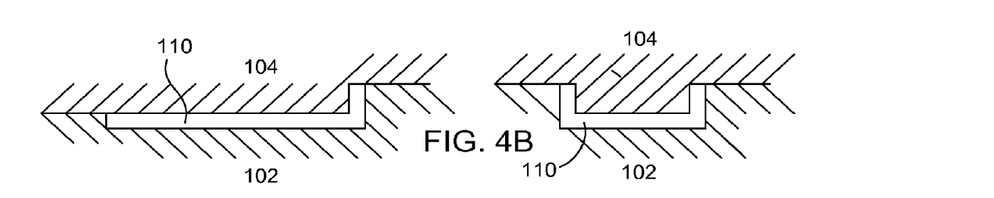

In FIG. 4B, the molds 102 and 104 are closed and the core 108 is inserted into the cavity 106 thereby forming a first void 110. The first void 110 provides the space for molding the first half of the enclosure, particularly, the front, top, and side walls of the enclosure.

Figure 4C:
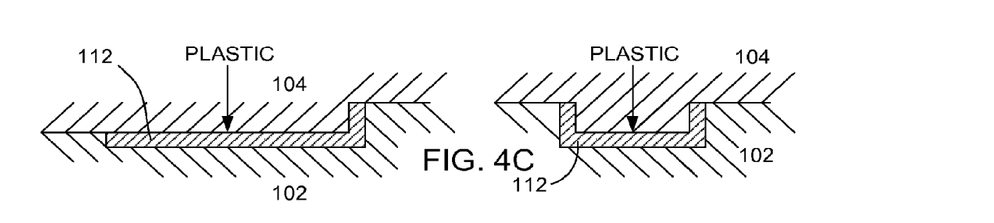

In FIG. 4C, plastic is injected into the first void 110. This may be accomplished with a gate located in the second mold 102. In the illustrated embodiment, the plastic is injected through the core 108 via the gate and thus the plastic flows first into the area of the void 110 that forms the front wall and then into the area of the void 110 that forms the top and side walls. By injecting plastic along the inner surface of the front wall, any imperfections created at the gate interface may be hidden inside the enclosure.

Unlike, the traditional part, the enclosure is formed horizontally rather than vertically as shown in FIG. 1. That is the part is laid during molding rather than being upright. As a result, the long longitudinal surface of the front wall does not include a taper. Furthermore, because the side and top walls are short, the walls may or may not include a taper. If a taper is used, it is typically very minimal because the part is easy to remove since the depth of the part is small, and/or because the part does not fully surround the core in the pull direction (e.g., one side is open thereby alleviating the squeezing caused by shrinkage). Even if a larger taper is used, the taper does not have a large affect on the wall thickness because of the shallow depth, i.e., the draft increases the wall thickness very minimally. As should be appreciated, the longer the part, the greater the impact of the draft angle. By way of example, the taper is less than about 0.5 degrees, and more particularly zero or near zero.

Figure 4D:
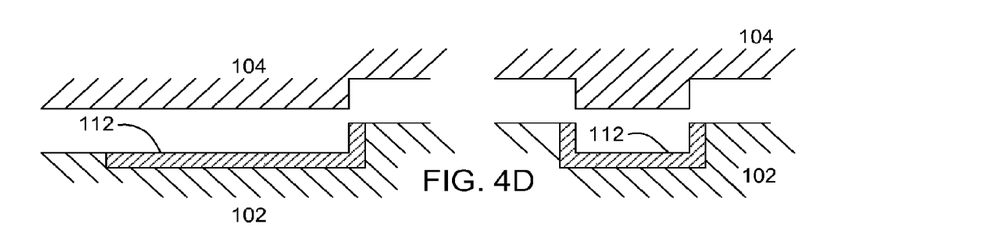

In FIG. 4D, the molds 102 and 104 are opened and the core 108 is removed from the first half of the enclosure 112, which stays inside the cavity 106. Once the molds 102 and 104 are opened, the first half of the enclosure 112 is ready for the second shot. In some cases, the first half of the enclosure 112 remains in the first mold during the second shot (double shot), and in other cases the first half of the enclosure 112 is ejected and moved to another set of molds (transfer). In the illustrated embodiment, the first half of the enclosure 112 stays with the first mold 102, however it is moved from one molding area to another molding area. For example, the first mold 102 may rotate so that the first half of the enclosure 112 can interface with another part of the second mold 104 that is configured for forming the remaining portions of the enclosure.

Figure 4E:
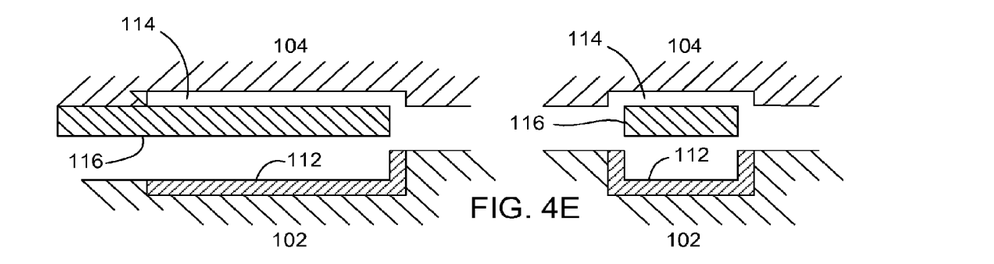

In FIG. 4E, the first mold 102 transports the first half of the enclosure 112 to a second molding area of the second mold 104. The second molding area of the second mold 104 includes a second cavity 114 with an insert 116 partially positioned in front of the second cavity 114. The insert 116 is sized and dimension for placement inside the first half of the enclosure 112 between the walls. The insert 116 is configured to protect the existing walls and form the remaining walls during the second injection process.

Figure 4F:
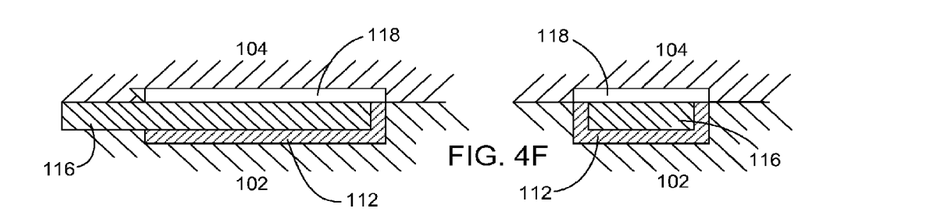

In FIG. 4F, the molds 102 and 104 are closed and the insert 116 is placed inside the internal space of the first half of the enclosure 112 thereby leaving the edges of the walls exposed to the second cavity 114. The insert hits tight against the inside surfaces of the first half of the enclosure (shuts off the inside surfaces for the second shot except at the edges where the remaining walls are connected to the existing walls). The second cavity 114 in cooperation with the wall edges and the back surface of the insert 116 form a second void 118. The second void 118 provides the space for molding the second half of the enclosure, particularly, the back wall of the enclosure.

Figure 4G:
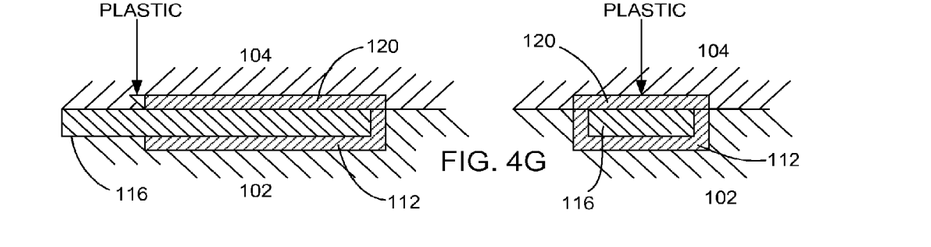

In FIG. 4G, plastic is injected into the second void 118. This may be accomplished with a second gate located in the second mold 104. In the illustrated embodiment, the plastic is injected at the bottom edge of the second cavity 114 and thus the plastic flows first into the bottom of the back wall and then to top of the back wall and the edges of the exposed front, top and side walls. By injecting plastic at the bottom edge, any imperfections created at the gate interface may be easily removed as for example during a machining operation.

When the injected molten plastic comes into contact with the edges of the existing walls, the molten plastic melts the edges of the existing walls thereby allowing the back wall to fuse with the other walls. In essence, the plastic of the second shot recombines with the plastic of the first shot thereby forming a single integral enclosure 120. After injection, the enclosure 120 is allowed to solidify.

Because the first half of the enclosure is frozen and the second half of the enclosure is molten during the second shot, the first half of the enclosure may have the tendency to curl up when the molten material of the second half of the enclosure begins to cool (as the second half solidifies, it begins to shrink which squeezes the first half of the enclosure). Unfortunately, this may adversely affect the structural strength, dimensional tolerances, and aesthetics of the enclosure.

Several techniques can be performed to prevent curling during the second shot. In one embodiment, the first mold includes one or more retention features that help hold the first half of the enclosure rigid inside the cavity during the second shot. The retention features may for example be protrusions that are located inside the cavity along the front wall. The protrusions increase the surface area onto which plastic is molded during the first shot thereby increasing the sticktion force between the cavity and the part. They also provide pilings that help capture the part thereby preventing any bowing. For at least these reasons, the first half of the enclosure is prevented from curling up. In the illustrated embodiment, the retention features are a pair of spatially separated but side by side nubs 121. One of the nubs 121 is located closer to the right side and the other nub 121 is located closer to the left side thereby creating a more rigid structure on both sides. In some cases, the nubs 121 may include a slight taper for helping remove the part from the cavity when the process is completed. In other cases, the nubs 121 may be strategically placed at locations where aesthetics are of no concern or alternatively locations that can be machined or removed altogether. For example, the nubs may be positioned at locations where an opening will eventually be created in the enclosure for I/O devices such as buttons or displays.

In another embodiment, the insert may include a cooling feature. The cooling feature prevents the insert from getting too hot. Because the core is thin (shallow depth), it heats up very rapidly and the heat may cause the first half of the enclosure to soften which as a result reduces the enclosure's resistance to creep and bending. The cooling keeps the first half of the enclosure rigid, which helps prevent the curling effect. In one implementation, the cooling is provided by one or more cooling channels that run through the insert and that maintain the temperature of the insert at an appropriate level. For example, water can run through the channels.

Figure 4H:
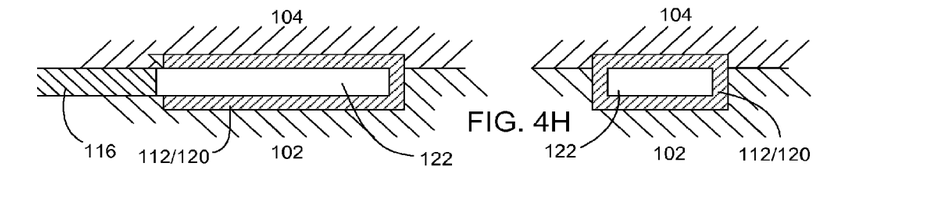

In FIG. 4H, the insert 116 is removed from the internal space 122 of the enclosure 120. This may be accomplished via a sliding action. Because only the back wall is made with molten plastic, the side of the insert 116 that helped form the second void typically does not require a taper or alternatively only requires a minimal taper in order to remove the insert 116 from the internal space 122 of the enclosure 120. As should be appreciated, this is the only place that has any sticktion force as the existing walls have already solidified and therefore there is substantially no sticktion between the existing walls and the insert 116. That is, because the existing walls are already frozen when the insert is placed therein, the insert does not stick thereto making the release manageable without a draft. Furthermore, because the existing walls are solid they do not shrink around the insert. In essence, the draft can be much less that would normally be used since its only one side and therefore the sticktion force and shrinkage force is much less. By way of example, the draft angle of the insert on the side of the back wall may be less than 0.25 degree, and more particularly, zero or substantially non-zero.

In some cases, the surfaces of the insert 116, and mainly the surfaces in contact with the molten plastic, are polished to make the removal from the enclosure much easier. In one particular embodiment, the final polishing step used to create the polished surfaces is performed in the pull direction so that the polishing lines run parallel to the pull direction. Not only does this help in the removal, but it also helps prevent mystery or sink marks from forming on the surfaces during removal of the insert from the enclosure. It has been found that if the final polishing steps is performed in a direct transverse to the pull direction, sink marks may be created on the surfaces of the part when the insert is pulled out of the enclosure. In some cases, this may even cause the part to deform.

Figure 4I:
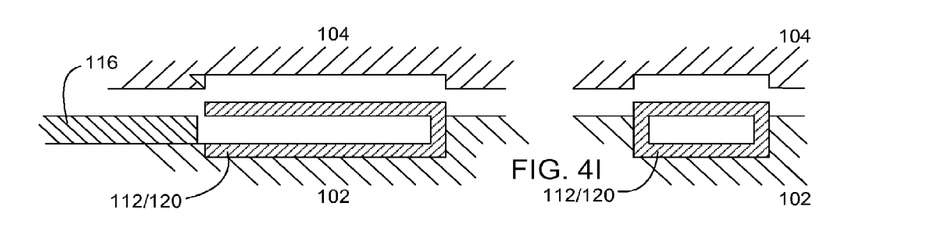

In FIG. 4I, the molds 102 and 104 are opened. In most cases, the enclosure 120 stays inside the first cavity 106 of the first mold 102.

Figure 4J:
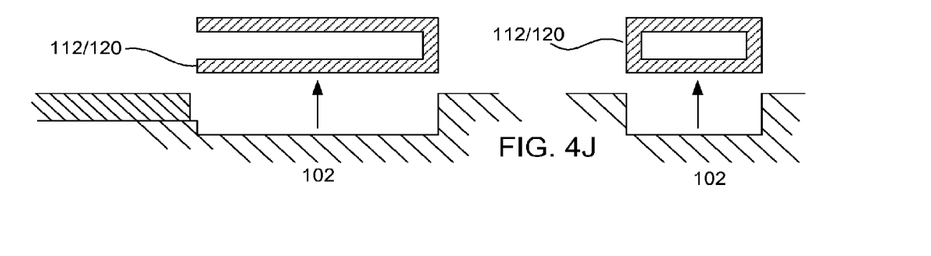

In FIG. 4J, the enclosure 120 is ejected from the first mold 102. In some cases, a robot arm with suction cups picks the enclosure 120 out of the first mold 102 and transfers it to another area where post molding steps may be performed. For example, machining steps may be performed as for example to clean up the edges of the enclosure 120.

Figure 5:
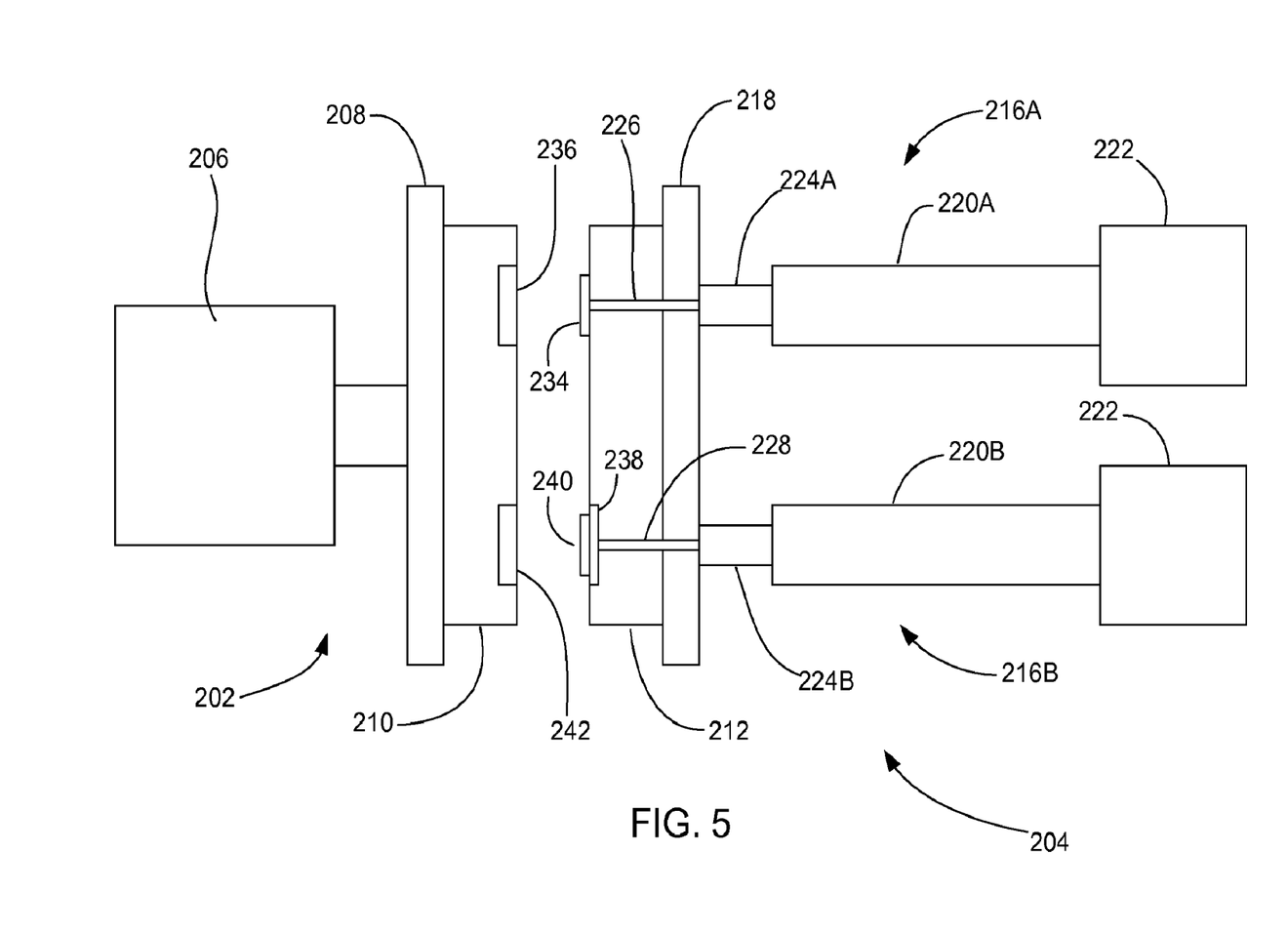
FIG. 5 is a diagram of a double shot injection molding apparatus, in accordance with one embodiment of the present invention.

FIG. 5 is a diagram of a double shot injection molding apparatus 200, in accordance with one embodiment of the present invention. The double shot injection molding apparatus 200 is configured to perform two shots in the same machine and using the same molds—the first shot forming the first half of the enclosure, the second shot forming the second half of the enclosure and fusing the second half to the first half. One advantage of double shot is that the part stays in the mold, and as a result there is less handling, quicker cycle times and better cosmetics.

As shown, the molding apparatus 200 includes a mold positioning mechanism 202 and an injection unit 204. The mold positioning mechanism 202 includes a clamping unit 206 and a rotating platen 208. The clamping unit 206 is configured to clamp first and second molds 210 and 212 together along a clamping axis 214. The rotating platen 208 is configured to rotate the first mold 210 about the clamping axis 214 in order to reposition the first mold 210 with the second mold 212. The rotating platen 208 may for example rotate the first mold 210 after the first shot in order to position the first half of the enclosure for the second shot.

The injection unit 204, on the other hand, includes a pair of injectors 216A and 216B and a fixed platen 218. The fixed platen 218 is configured to support the second mold 212 during the injection processes. The injectors 216 are configured to inject plastic into the molds 210 and 212 when they are clamped together. The first injector 216A is configured to produce the first shot and the second injector 216B is configured to produce the second shot of the double shot molding apparatus 200. Each injector 216 includes a heating cylinder 220 and a material feed system 222 such as a hopper. Alternatively, a single material feed system may be used to feed material to both heating cylinders. The injectors 216 are configured to force molten plastic out of nozzles 224A and 224B and into gates 226 and 228 found in the second mold 212. The first gate 226 distributes the molten plastic to a first molding area 230 of the second mold 212, and the second gate 228 distributes molten plastic to a second molding area 232 of the second mold 212.

The first molding area 230 includes a core 234 that that interfaces with a cavity 236 on the first mold 210 during the first shot. The first gate 226 is positioned through the core 234 so that plastic can be forced into the void created by the core 234 and the cavity 236. The second molding area 22 includes a cavity 238 and a movable insert 240 located in front of the cavity 238. The second gate 228 exits into the cavity 240 so that molten plastic can be forced into the void created by the insert 240 and the cavity 238. This arrangement is configured to interface with a second cavity 242 on the first mold 210 during the second shot. The second cavity 242, which includes the first half of the enclosure, is rotated into alignment with the insert 240 of the second mold 212 after the first shot, and the first cavity 236 is rotated into alignment with the core 234 of the second mold 212 after the second shot and after the final molded enclosure is ejected from the first mold 210. The insert 240 is configured for placement in the first half of the enclosure, which is left in the second cavity 242. The insert 240 protects the existing walls of the first half of the enclosure while leaving the edges of the existing walls exposed to the molten plastic of the second shot. The insert 240 is slidably coupled to the second mold 212. Once the part cools, the insert 240 slides out of the part in a direction that is transverse to the injection axis. For example, the insert 240 may slide into or out of the page.

Figure 6:
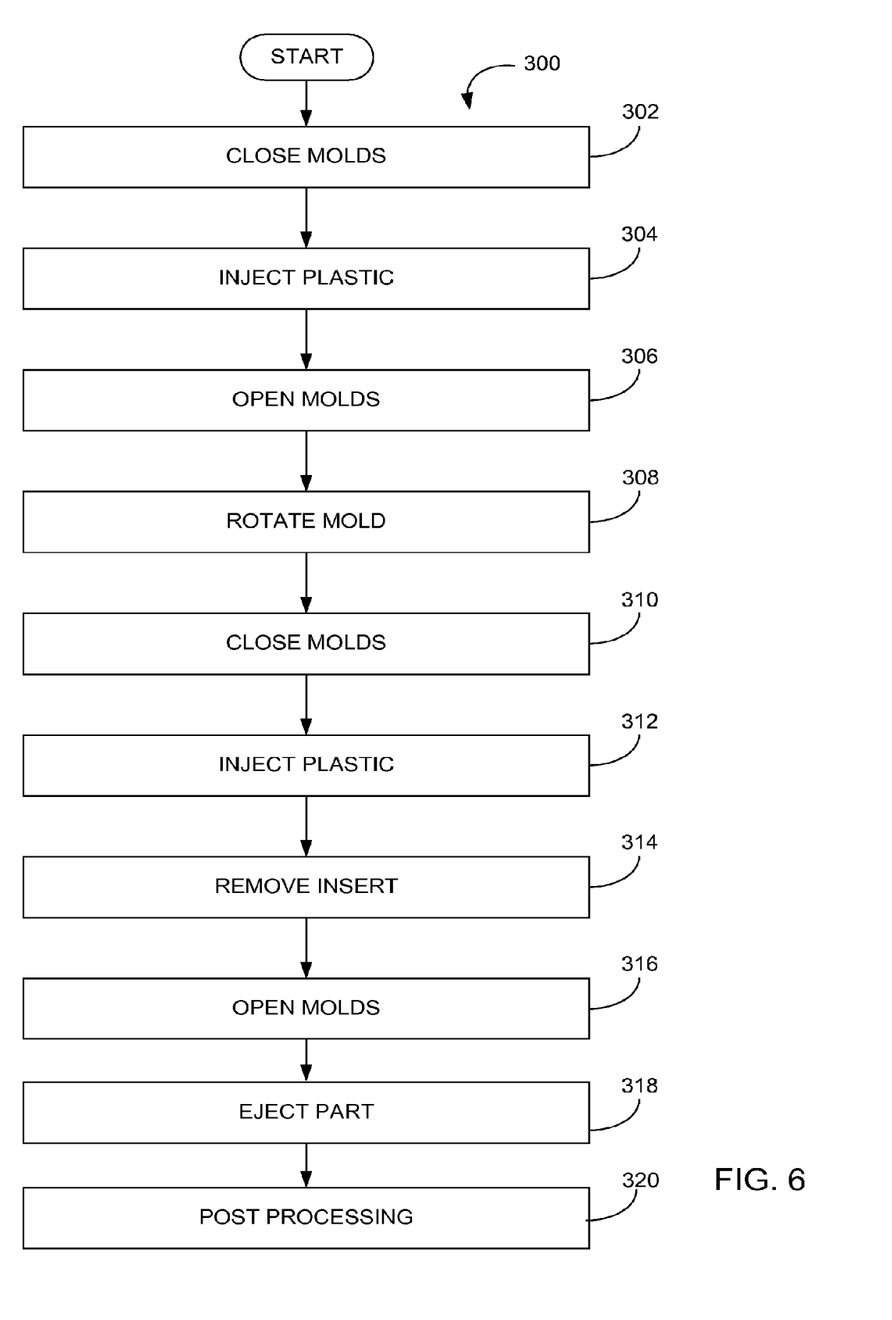
FIG. 6 is a flow diagram of a double shot injection method, in accordance with one embodiment of the present invention.

FIG. 6 is a flow diagram of a double shot injection method 300, in accordance with one embodiment of the present invention. The flow diagram may for example be used to operate the apparatus described in FIG. 5. The method begins at block 302 where the first mold 210 closes thereby causing the core 234 of the second mold 212 to be inserted into the cavity 236 of the first mold 210. When closed the molds 210 and 212 form a void in the shape of the first half of the enclosure.

Thereafter in block 304, plastic is injected into the void through the second mold 212 so as to form the first half of the enclosure. The gate 226 is located in the core 234 and injects plastic in the middle of the void. The molten plastic flows out of the gate 226 into the area that forms the front wall of the enclosure and eventually flows into areas that form the side walls and top wall of the enclosure. Once filled, the first half of the enclosure is allowed to cool and solidify. The first half of the enclosure includes an integral front wall, top wall, and left and right side walls and an open bottom end, and no back wall.

Following block 304, the method proceeds to block 306 where the first mold 210 opens. The first half of the enclosure stays in the first mold 210 after the opening sequence.

Thereafter, in block 308 the first mold 210 rotates while the second mold 212 stays fixed. The first mold 210 is rotated so that the second half of the enclosure can be integrally formed with the first half of the enclosure. The first half of the enclosure is rotated until it is aligned with the movable insert 240 of the second mold 212. The movable insert 240 is configured for placement in the internal space of the first half of the enclosure.

Following block 308, the method proceeds to block 310 where the first mold 210 is closed and the insert 240 is placed into the internal space of the first half of the enclosure. The insert 240 forms a tight fit against the walls of the first half of the enclosure so that the walls are protected during the second shot. The insert 240 does however leave the edges of the walls exposed to the cavity 238 located behind the movable insert 240.

Thereafter in block 312, plastic is injected into the cavity 238 from the second mold 212 so as to form the second half of the enclosure. The plastic flows out of the gate 228 and into the void that forms the back wall of the enclosure. As it fills the void, the molten plastic comes into contact with the edge of the walls thereby fusing the back wall to the side and top walls of the first half of the enclosure. Once filled, the second half of the enclosure is allowed to cool and solidify. This forms an enclosure with an open bottom end and five integrally formed walls.

Following block 312, the method proceeds to block 314 where the movable insert 240 is removed. That is, the insert 240 slides out the open bottom end in a direction that is transverse to the gate 228 (e.g., radially).

Thereafter in block 316 the first mold 210 opens. The enclosure stays in the cavity 242 of the first mold 210 during opening.

Following block 316, the method proceeds to block 318 where the enclosure is ejected from the first mold 210.

Thereafter in block 320, post molding steps are performed. For example, the enclosure is machined to final its form factor.

Figures 7A, 7B:
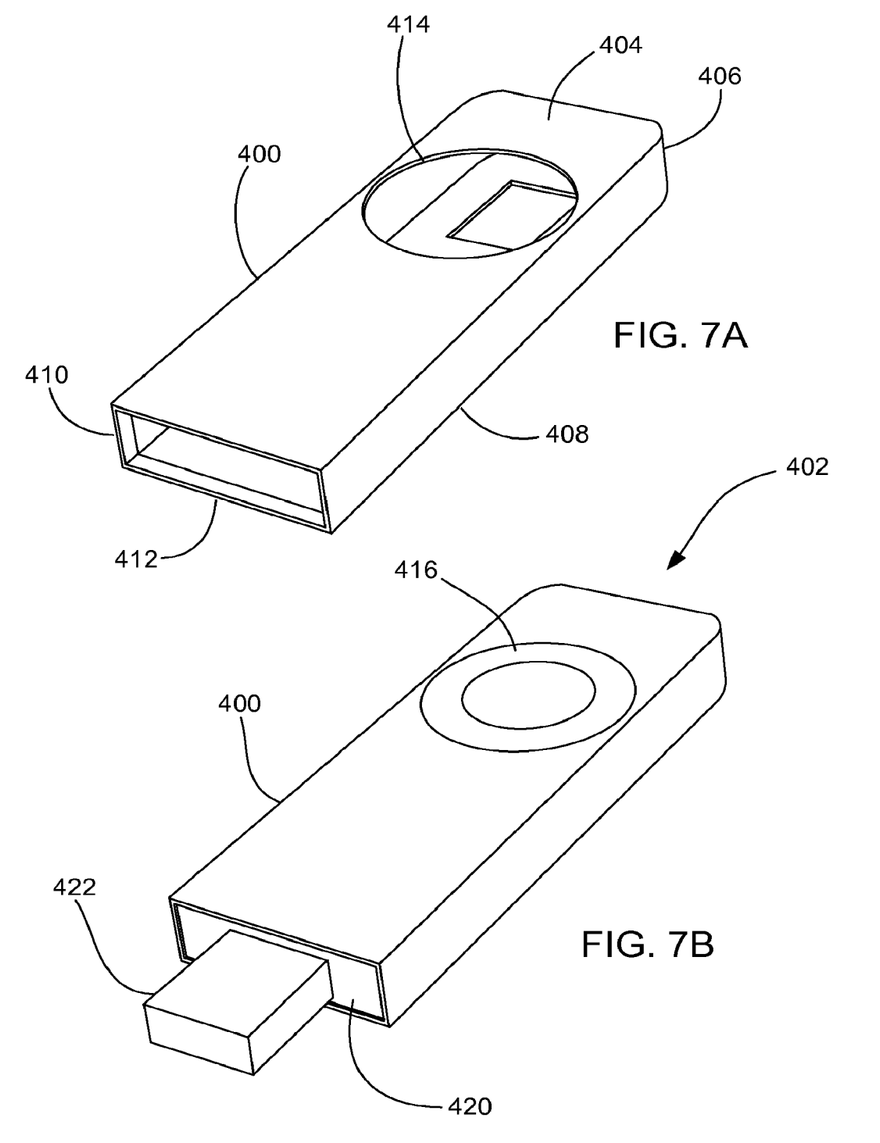
FIG. 7A is a diagram of a key-like enclosure, in accordance with one embodiment of the present invention.
FIG. 7B is diagram of a finally assembled media player 402 that utilizes the enclosure of FIG. 7A, in accordance with one embodiment of the present invention.

In accordance with one embodiment, the enclosure as described above is configured as a key-like device such as a USB key or miniature media player. FIG. 7A is a diagram of a key-like enclosure 400, and FIG. 7B is diagram of a finally assembled media player 402 that utilizes the enclosure 400. As shown, the enclosure 400 extends longitudinally and includes five walls and an open end. The five walls are integrally formed as a single part. The front wall 404 and side walls 406, 408 and 410 are formed in the first shot, and the back wall 412 is formed in the second shot.

After the enclosure 400 is formed, various surfaces are machined to allow access to I/O devices or to remove excess material. In the illustrated embodiment, a circle 414 is machined in the front wall 404 to accommodate a button wheel 416 and a rectangle 416 is machined in the back wall 412 to accommodate a switch (not show). In one embodiment, the gates are strategically placed at locations on the enclosure that would normally be machined to accommodate other parts. In one implementation, the gate that forms the front wall 404 is located in the region where the button wheel 416 is located. As such, the surface marks associated with gate are removed while making space for the button wheel 416. In another implementation, the gate that forms the back wall is located at the bottom edge of the back wall so that the outer surface of the back wall is free from gate imperfections. In this implementation, the bottom edges are machined to remove excess material generated at the gate during the second shot.

Once the surfaces are machined, the internal parts are positioned inside the enclosure, and the open bottom end is sealed with a wall 420 that includes a USB or alternatively a Firewire connector 422. The connector 422 and bottom wall 420 may be connected to a printed circuit board that includes the electrical hardware for the media player. The media player may therefore be assembled with ease, i.e., insert the PCB assembly into the enclosure while sealing the bottom end.

Figure 8:
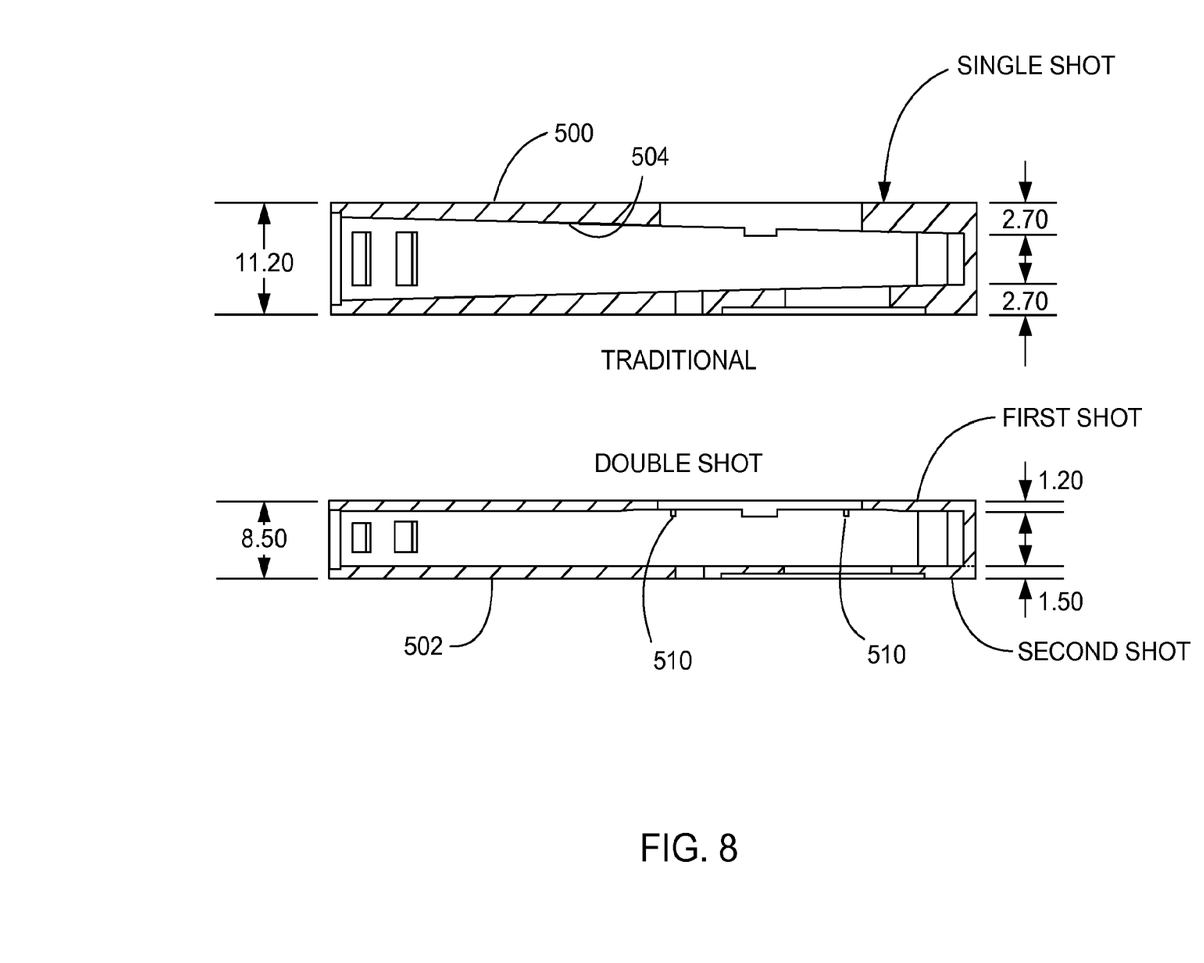
FIG. 8 are cross sectional side views showing a side by side comparison of an enclosure formed via a traditional single shot process and an enclosure formed via the inventive two shot process, in accordance with one embodiment of the present invention.

FIG. 8 are cross sectional side views showing a side by side comparison of an enclosure 500 formed via a traditional single shot process and an enclosure 502 formed via the inventive two shot process. Each part is designed to provide the volume necessary to accommodate all of the internal electronic parts inside the enclosure. Because of the use of a draft angle, the traditional enclosure 500 includes a large taper 504 along its longitudinal surfaces. As a result, the wall thickness t increases from the open end to the close end of the enclosure 500. In order to provide the internal volume necessary, the depth D of the traditional part 500 is increased to make up for the increased thickness at the closed end. In contrast, the two shot enclosure 502 of the present invention does not include any taper along the longitudinal surfaces and if a taper is needed it is typically very minimal. The thickness t therefore remains substantially uniform from the bottom to the top ends. As such, the overall depth D of the part can be minimized to accommodate the same space as the traditional part 500.

In one example, the thickness t of the two shot enclosure 502 is a substantially uniform thickness of about 1.2 mm for the back surface and about 1.5 mm for the front surfaces with an overall depth D of about 8.5 mm In contrast, using conventional techniques, the traditional enclosure 500, includes thickness t that varies between 1.2 mm at the open end to 2.7 mm at the closed end with an overall depth of about 11.2 mm. Moreover, the two shot enclosure 502 includes internal structural features 510 on the front longitudinal surface whereas the traditional part 500 does not. The internal features may for example be embossments or undercuts in the inside surface of the front wall of the enclosure for helping position and support the button wheel.

The advantages of the invention are numerous. Different aspects, embodiments or implementations may yield one or more of the following advantages. One advantage of the invention is that the overall size of the enclosure can be reduced while maintaining the useable space inside the enclosure. Another advantage is that the thickness of the wall can remain thin and substantially uniform. This saves material costs and reduces the cosmetic risks (sink, cooling/flatness issues, etc.). Another advantage is that the invention additionally allows for placement of structural and placement features that would be nearly impossible using traditional molding techniques.

While this invention has been described in terms of several preferred embodiments, there are alterations, permutations, and equivalents, which fall within the scope of this invention. It should also be noted that there are many alternative ways of implementing the methods and apparatuses of the present invention.

It is therefore intended that the following appended claims be interpreted as including all such alterations, permutations, and equivalents as fall within the true spirit and scope of the present invention.

What is claimed is:

1. A method for forming an enclosure for enclosing internal electronic components of an electronic device, comprising:
    performing a first injection molding process, the first injection molding process forming at least an entire first substantially planar wall of the enclosure;
    allowing the at least an entire first substantially planar wall of the enclosure to solidify;
    thereafter performing a second injection molding process, the second injection molding process forming at least a second substantially planar wall of the enclosure, the at least a second substantially planar wall of the enclosure fusing with the at least an entire first substantially planar wall of the enclosure during the second injection molding process, the at least second substantially planar wall of the enclosure forming at least one different side of the enclosure than the at least an entire first substantially planar wall of the enclosure; and
    allowing the at least a second substantially planar wall of the enclosure to solidify, the at least a second substantially planar wall of the enclosure being integrally formed with the at least an entire first substantially planar wall of the enclosure to thereby form a single-piece elongated multi-walled enclosure, wherein each wall is substantially parallel or substantially orthogonal to another wall and wherein each wall has a substantially uniform thickness along its entire length, wherein the at least an entire first substantially planar wall and the at least a second substantially planar wall have a taper angle of 0.25 degree or less.

2. The method, as recited in claim 1, wherein the enclosure has a length, a width, and a depth, and the length of the enclosure is substantially greater than the depth of the enclosure.

3. The method, as recited in claim 2, wherein the length of the enclosure is at least approximately eight times the depth of the enclosure.

4. The method, as recited in claim 2, wherein the at least a first wall and the at least a second wall each has a thickness of less than approximately 1.5 mm.

5. The method, as recited in claim 2, wherein during the first and second injection molding processes, enclosure walls defined by the length and the width of the enclosure are formed horizontally, and enclosure walls defined by the length and the depth of the enclosure and enclosure walls defined by the width and the depth of the enclosure are formed vertically.

6. The method, as recited in claim 5, wherein the horizontally formed enclosure walls have a taper angle of approximately 0 degree, and the vertically formed enclosure walls have a taper angle of less than approximately 0.25 degrees.

7. The method, as recited in claim 2, wherein the at least a first wall and the at least a second wall each has a taper angle of approximately 0 degree.

8. The method, as recited in claim 7, wherein there is no visible seam on surfaces of the single-piece multi-walled enclosure.

9. The method, as recited in claim 1, wherein
the single-piece multi-walled enclosure comprises
    a top wall defined by the width and the depth of the enclosure,
    a right side wall and a left side wall, each defined by the length and the depth of the enclosure, and
    a front wall and a back wall, each defined by the length and the width of the enclosure,
the first injection molding process forms at least the front wall, and
the second injection molding process forms at least the back wall.

10. A method for forming an integrally molded single-piece multi-walled enclosure that defines an open space for placement of internal components via a double shot injection molding process, wherein the double shot injection molding process comprises:
    forming at least one wall of the single-piece multi-walled enclosure with a first shot; and
    forming remaining walls of the single-piece multi-walled enclosure with a second shot, wherein each of the remaining walls is in a plane different from a plane of the at least one wall, and wherein the at least one wall formed with the first shot fusing with the walls formed with the second shot during the second shot so as to form the integrally molded single-piece multi-walled enclosure, wherein each wall is substantially parallel or substantially orthogonal to another wall and wherein at least two walls have a taper angle of 0.25 degree or less.

11. The method, as recited in claim 10, wherein all of the walls have a taper angle of 0.25 degree or less.

12. The method, as recited in claim 10, wherein the single-piece multi-walled enclosure is a five wall enclosure with an open end.

13. The method, as recited in claim 10, wherein the single-piece multi-walled enclosure has a length that extends from a top to a bottom end of the single-piece multi-walled enclosure, wherein the length is at least approximately eight times a depth of the enclosure.

14. The method, as recited in claim 10, wherein the at least one wall of the single-piece multi-walled enclosure formed with the first shot includes a front wall, a right side wall, a left side wall, and a top wall, and wherein the remaining walls of the single-piece multi-walled enclosure formed with the second shot includes a back wall.

15. The method, as recited in claim 10, wherein inside surfaces of the single-piece multi-walled enclosure have limited or no taper, and wherein a thickness of the walls of single-piece multi-walled enclosure is substantially uniform from a top to a bottom end of the single-piece multi-walled enclosure.

16. The method, as recited in claim 10, wherein the first shot comprises:
    forming a first void;
    injecting plastic into the first void to form a first part of the enclosure;
    allowing the first part to solidify; and
    inserting a wedge into the first part; and wherein the second shot comprises:
    forming a second void;
    injecting plastic into the second void to form a second part of the enclosure, the second part fusing with the first part during the injection thereby forming a single-piece enclosure with integral first and second parts;
    allowing the second part to solidify; and removing a wedge from the enclosure, the enclosure having five walls and an open end.

17. The method, as recited in claim 10, wherein a length of the enclosure is between about 40 to about 70 times a thickness of the walls.

18. The method, as recited in claim 10, wherein at least one of the walls includes internal features that are formed during the first or second shot and without using mechanical actions.

19. The method, as recited in claim 10, wherein the walls each have a substantially uniform thickness.

* * * * *